(12) United States Patent
Gogte et al.

(10) Patent No.: US 10,956,166 B2
(45) Date of Patent: Mar. 23, 2021

(54) INSTRUCTION ORDERING

(71) Applicants: Arm Limited, Cambridge (GB); The Regents of The University of Michigan, Ann Arbor, MI (US)

(72) Inventors: Vaibhav Gogte, Ann Arbor, MI (US); Wei Wang, Cambridge (GB); Stephan Diestelhorst, Cambridge (GB); Peter M Chen, Ann Arbor, MI (US); Satish Narayanasamy, Ann Arbor, MI (US); Thomas Friedrich Wenisch, Ann Arbor, MI (US)

(73) Assignees: Arm Limited, Cambridge (GB); The Regents of The University of Michigan, Ann Arbor, MI (US)

( * ) Notice: Subject to any disclaimer, the term of this patent is extended or adjusted under 35 U.S.C. 154(b) by 34 days.

(21) Appl. No.: 16/296,507

(22) Filed: Mar. 8, 2019

(65) Prior Publication Data
US 2020/0285479 A1 Sep. 10, 2020

(51) Int. Cl.
*G06F 9/38* (2018.01)
*G06F 9/52* (2006.01)

(52) U.S. Cl.
CPC ......... *G06F 9/3851* (2013.01); *G06F 9/3855* (2013.01); *G06F 9/522* (2013.01)

(58) Field of Classification Search
None
See application file for complete search history.

(56) References Cited

U.S. PATENT DOCUMENTS

| | | | |
|---|---|---|---|
| 6,691,220 B1 * | 2/2004 | Guthrie | G06F 9/3836 712/219 |
| 7,555,607 B2 * | 6/2009 | Collard | G06F 9/52 711/125 |

(Continued)

FOREIGN PATENT DOCUMENTS

GB 2512478 10/2014

OTHER PUBLICATIONS

Gope et al., "A Case for Scoped Persist Barriers in GPUs", Proceedings of the 11th Workshop on General Purpose GPUs, Feb. 24-28, 2018, 11 pages.

(Continued)

*Primary Examiner* — Michael Sun
(74) *Attorney, Agent, or Firm* — Nixon & Vanderhye P.C.

(57) ABSTRACT

A data processing apparatus includes obtain circuitry that obtains a stream of instructions. The stream of instructions includes a barrier creation instruction and a barrier inhibition instruction. Track circuitry orders sending each instruction in the stream of instructions to processing circuitry based on one or more dependencies. The track circuitry is responsive to the barrier creation instruction to cause the one or more dependencies to include one or more barrier dependencies in which pre-barrier instructions, occurring before the barrier creation instruction in the stream, are sent before post-barrier instructions, occurring after the barrier creation instruction in the stream, are sent. The track circuitry is also responsive to the barrier inhibition instruction to relax the barrier dependencies to permit post-inhibition instructions, occurring after the barrier inhibition instruction in the stream, to be sent before the pre-barrier instructions.

20 Claims, 9 Drawing Sheets

(56) References Cited

U.S. PATENT DOCUMENTS

| | | | | |
|---|---|---|---|---|
| 7,587,555 | B2* | 9/2009 | Collard | G06F 9/52 |
| | | | | 711/125 |
| 9,946,492 | B2* | 4/2018 | Diestelhorst | G06F 3/0656 |
| 2014/0032854 | A1* | 1/2014 | Lih | G06F 12/0837 |
| | | | | 711/141 |
| 2014/0047205 | A1* | 2/2014 | Frey | G06F 3/0668 |
| | | | | 711/163 |
| 2017/0083338 | A1* | 3/2017 | Burger | G06F 9/3802 |
| 2017/0083339 | A1* | 3/2017 | Burger | G06F 9/30087 |
| 2018/0032344 | A1* | 2/2018 | Smith | G06F 9/3834 |
| 2018/0300148 | A1* | 10/2018 | Schuttenberg | G06F 9/522 |
| 2019/0108027 | A1* | 4/2019 | Lloyd | G06F 12/1009 |
| 2019/0108033 | A1* | 4/2019 | Gonzalez | G06F 9/3855 |

OTHER PUBLICATIONS

Pelley et al., "Memory Persistency", Proceedings of the 41st annual international symposium on Computer architecture, Jun. 14-18, 2014, 12 pages.

Robert Bedichek, "Some Efficient Architecture Simulation Techniques", Winter 1990 USENIX Conference, 1990, 12 pages.

International Search Report and Written Opinion of the International Searching Authority for PCT/GB2019/053330 dated Feb. 26, 2020, 14 pages.

* cited by examiner

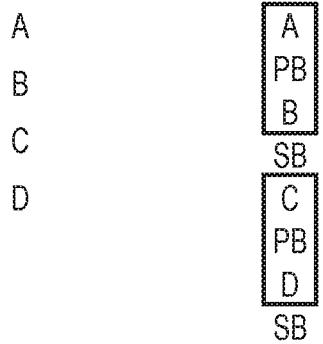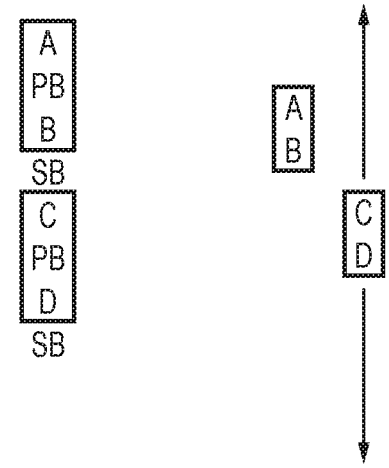
FIG. 4A  FIG. 4B  FIG. 4C

INSTRUCTION ORDERING

TECHNICAL FIELD

The present disclosure relates to data processing. For instance, the present techniques has relevance to the field of instruction ordering and dependencies.

DESCRIPTION

In a data processing apparatus, it may be desirable to enforce an ordering such that some instructions can only be executed after other instructions have executed. This could perhaps be achieved by a 'barrier' of sorts that prohibits later instructions from executing until the earlier instructions have executed. In practice, however, this places large constraints on instruction ordering.

SUMMARY

Viewed from a first example configuration, there is provided a data processing apparatus comprising: obtain circuitry to obtain a stream of instructions, the stream of instructions comprising a barrier creation instruction and a barrier inhibition instruction; and track circuitry to order sending each instruction in the stream of instructions to processing circuitry based on one or more dependencies, wherein the track circuitry is responsive to the barrier creation instruction to cause the one or more dependencies to include one or more barrier dependencies in which pre-barrier instructions, occurring before the barrier creation instruction in the stream, are sent before post-barrier instructions, occurring after the barrier creation instruction in the stream, are sent; and the track circuitry is responsive to the barrier inhibition instruction to relax the barrier dependencies to permit post-inhibition instructions, occurring after the barrier inhibition instruction in the stream, to be sent before the pre-barrier instructions.

Viewed from a second example configuration, there is provided a data processing method, comprising: obtaining a stream of instructions, the stream of instructions comprising a barrier creation instruction and a barrier inhibition instruction; and sending each instruction in the stream of instructions to processing circuitry in order based on one or more dependencies, wherein in response to the barrier creation instruction, the one or more dependencies are amended to include one or more barrier dependencies in which pre-barrier instructions, occurring before the barrier creation instruction in the stream, are sent before post-barrier instructions, occurring after the barrier creation instruction in the stream, are sent; and in response to the barrier inhibition instruction, to relax the barrier dependencies are relaxed to permit post-inhibition instructions, occurring after the barrier inhibition instruction in the stream, to be sent before the pre-barrier instructions.

Viewed from a third example configuration, there is provided a computer program for controlling a host data processing apparatus to provide an instruction execution environment for execution of instructions; the computer program comprising: obtaining logic to obtain a stream of instructions, the stream of instructions comprising a barrier creation instruction and a barrier inhibition instruction; and sending logic to send each instruction in the stream of instructions to processing circuitry in order based on one or more dependencies, wherein in response to the barrier creation instruction, the one or more dependencies are amended to include one or more barrier dependencies in which pre-barrier instructions, occurring before the barrier creation instruction in the stream, are sent before post-barrier instructions, occurring after the barrier creation instruction in the stream, are sent; and in response to the barrier inhibition instruction, to relax the barrier dependencies are relaxed to permit post-inhibition instructions, occurring after the barrier inhibition instruction in the stream, to be sent before the pre-barrier instructions.

Viewed from a fourth example configuration, there is provided a data processing apparatus comprising: input circuitry to receive a plurality of input instructions comprising an atomic region; output circuitry to provide output instructions corresponding to the input instructions; and transformation circuitry to transform the input instructions into the output instructions, wherein the atomic region defines a subset of the input instructions in which, during execution, if one of the instructions in the subset fails to execute, then the subset of the input instructions are rewound; and the transformation circuitry generates, for an atomic instruction in the atomic region: a log instruction to log a state change caused by the atomic instruction, a barrier creation instruction, a corresponding instruction that corresponds with the atomic instruction, and a barrier inhibition instruction.

Viewed from a fifth example configuration, there is provided a data processing method comprising: receiving a plurality of input instructions comprising an atomic region; providing output instructions corresponding to the input instructions; and transforming the input instructions into the output instructions, wherein the atomic region defines a subset of the input instructions in which, during execution, if one of the instructions in the subset fails to execute, then the subset of the input instructions are rewound; and the step of transforming generates, for an atomic instruction in the atomic region: a log instruction corresponding with the atomic instruction, a barrier creation instruction, a corresponding instruction that corresponds with the atomic instruction, and a barrier inhibition instruction.

BRIEF DESCRIPTION OF THE DRAWINGS

The present invention will be described further, by way of example only, with reference to embodiments thereof as illustrated in the accompanying drawings, in which:

FIGS. 4A, 4B, and 4C show how the use of barrier creation instructions and barrier inhibition instructions permits more flexible ordering of instruction execution;

DESCRIPTION OF EXAMPLE EMBODIMENTS

Figure 1:
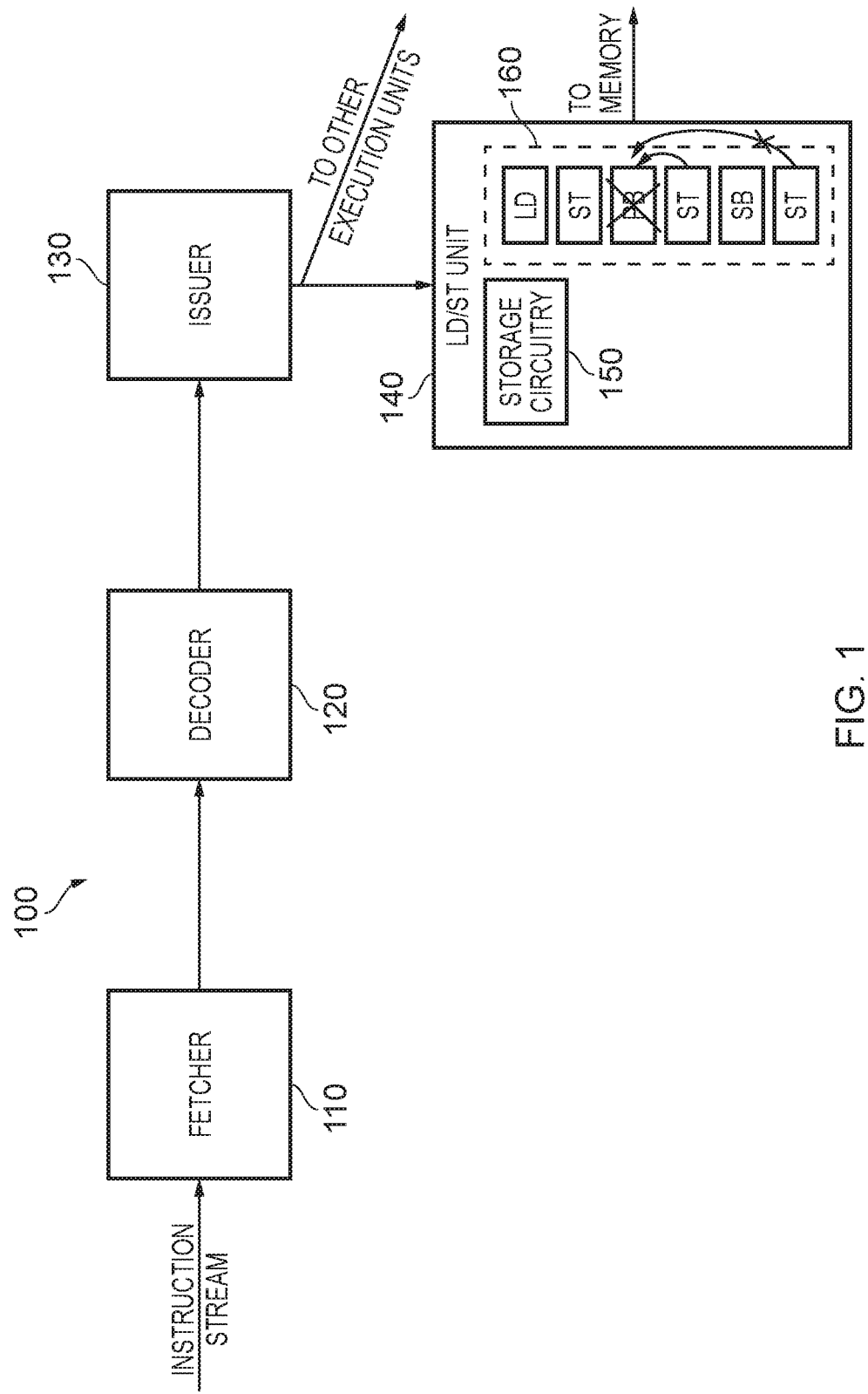
FIG. 1 schematically illustrates a data processing apparatus in accordance with some embodiments.

Before discussing the embodiments with reference to the accompanying figures, the following description of embodiments is provided.

In accordance with some embodiments there is provided a data processing apparatus comprising: obtain circuitry to obtain a stream of instructions, the stream of instructions comprising a barrier creation instruction and a barrier inhibition instruction; and track circuitry to order sending each instruction in the stream of instructions to processing circuitry based on one or more dependencies, wherein the track circuitry is responsive to the barrier creation instruction to cause the one or more dependencies to include one or more barrier dependencies in which pre-barrier instructions, occurring before the barrier creation instruction in the stream, are sent before post-barrier instructions, occurring after the barrier creation instruction in the stream, are sent; and the track circuitry is responsive to the barrier inhibition instruction to relax the barrier dependencies to permit post-inhibition instructions, occurring after the barrier inhibition instruction in the stream, to be sent before the pre-barrier instructions.

In the above embodiments, a barrier creation instruction in the stream of instructions is used to create a barrier in the instructions. Instructions occurring prior to the barrier must be sent for execution (or, in some embodiments, fully executed) before any of the instructions appearing after the barrier can be sent for execution (or fully executed). This can be used to enforce a particular ordering on the instructions. In addition to this, a barrier inhibition instruction in the stream of instructions can be used to limit the effect of the barrier. In particular, any instructions in the stream of instructions that occur after the barrier inhibition instruction are not limited by the barrier. That is, instructions occurring after the barrier inhibition instruction are permitted to be sent for execution (or fully executed) even before the instructions occurring before the barrier creation instruction have been sent for execution (or fully executed). As a consequence of this, the flexibility of the instruction ordering can be made more flexible. Instructions appearing after the barrier inhibition instruction can be executed before, after, or even in parallel with the instructions occurring after the barrier. This permits the scheduling process to be more flexible and also increases the extent to which parallel processing can take place.

In some embodiments, the pre-barrier instructions, the post-barrier instructions, and the post-inhibition instructions comprise memory access instructions. The memory access instructions could include load and store instructions to a memory system in which data is stored.

In some embodiments, the memory access instructions are made to a persistent memory. Persistent memories combine the byte addressability of DRAM with the durability of storage devices such as hard disks and SSDs. In particular, persistent memories can be accessed using a byte-addressable load/store interface, avoiding software layers that are needed to access storage in a storage device (which are typically block addressable). However, unlike DRAM, the data can be persisted even in the absence of power.

In some embodiments, the one or more dependencies comprise one or more data dependencies between the instructions. Instructions may have dependencies between them. In particular, if one instruction modifies data and another instruction subsequently reads that data, then the second instruction is dependent on the first instruction. That is, the second instruction cannot be executed until the first instruction has been performed. In practice, this prohibits the second instruction from being executed before the first instruction.

In some embodiments, the track circuitry comprises queue circuitry comprising one or more entries, each of the entries corresponding to one of the instructions; and the track circuitry comprises storage circuitry to store a dependency matrix to represent the one or more dependencies. A dependency matrix is one way in which the relationship between instructions or data can be represented. For instance, each row in the matrix could represent one of the instructions in a queue of instructions, with each column in the matrix also representing one of those instructions. A '1' in row i, column j indicates that instruction number i in the queue is dependent on instruction number j in the queue. Meanwhile, a '0' indicates that there is no such dependency. The matrix can be updated each time an instruction is executed. In this way, it is possible to identify instructions that have no remaining dependencies and thus can be executed immediately. In such embodiments, the barrier creation instruction can be made part of the queue. The barrier creation instruction can be made dependent on the preceding instructions that it protects, and the following instructions that are subjected to the barrier can be made dependent on the barrier instruction.

In some embodiments, the track circuitry is adapted, in response to receiving a new instruction, to search the queue circuitry for an earlier barrier creation instruction and an earlier barrier inhibition instruction; when the earlier barrier creation instruction is found and the earlier barrier inhibition instruction is unfound, the barrier dependencies are added to inhibit the new instruction from being sent until the pre-barrier instructions are sent; and when the earlier barrier creation instruction is found and the earlier barrier inhibition instruction is found, the track circuitry inhibits adding the barrier dependencies. A record of the barrier and the inhibition instructions are kept. Consequently, when new instructions are encountered, it is possible to determine whether the barrier instruction applied (if the barrier instruction is found, and there is no inhibition instruction found) or not (if the barrier instruction and the inhibition instruction are both found). Clearly if no instruction is found then there is no barrier to be applied. Meanwhile, an inhibition instruction that is found when no barrier instruction is found would also generally have no effect.

In some embodiments, the track circuitry is a load store queue. The load store queue could be part of a memory fetch unit that is used to access a memory hierarchy. In other embodiments, the track circuitry could be issue circuitry that handles instructions of different types.

In some embodiments, the data processing apparatus comprises transaction circuitry to store a transaction of at least some of the instructions; and rollback circuitry to restore a previous state of the processing circuitry corresponding to before execution of the instructions, based on the transaction. In such embodiments, a group of instructions could be combined in order to form a transaction. In a transaction, either all of the instructions successfully complete or none of them do. Such a process can be performed by attempting to execute the instructions with a failure of a single instruction causing the data processing apparatus to "roll back" to before the transaction began. This can be achieved by the transaction circuitry maintaining a log (e.g. an undo log) that tracks how the state of the data processing apparatus is changed by instructions that form the transaction. If the transaction is deemed to have failed, then rollback circuitry uses the log in order to restore the state of the data processing apparatus. If the transaction is deemed to be successful then the log can be deleted.

In some embodiments, the track circuitry is adapted to send at least some of the instructions between the barrier creation instruction and the barrier inhibition instruction to the processing circuitry out of order. Here, "order" refers to the order in which the instructions are listed in the stream of instructions. Thus, even though the stream of instructions may list instructions in the order A, B, C, D, the data processing apparatus may execute the instructions in the order A, C, D, B. The order in which the instructions can be executed is dependent on the dependencies between those instructions. The use of the barrier creation and inhibition instructions make it possible to enforce particular dependencies without those dependencies being extended too far. Thus, as compared to a situation where only the barrier creation instruction exists, it is possible to have greater flexibility over the extent to which reordering of the instructions can take place.

In some embodiments, the processing circuitry comprises a plurality of processing circuits; and the track circuitry is adapted to send at least some of the instructions between the barrier creation instruction and the barrier inhibition instruction to different ones of the processing circuits. Hence, the limitation of the dependencies created by the barrier inhibition instruction may be such that groups of instructions are able to be executed in parallel. In comparison, when only a barrier creation instruction exists, dependencies can be put in place, but parallelisation could be more restricted. For instance, if the barrier inhibition instruction makes it possible for post-inhibition instructions to be 'unchained' from pre-barrier instructions, then the post-inhibition instructions could be executed in parallel with, for instance, the pre-barrier instructions.

In some embodiments, the one or more barrier dependencies are dependencies of instructions of a predetermined type. In this way, the barrier created by the barrier creation instruction could only apply to instructions of the predetermined type, while other instructions could be permitted to execute (or be sent for execution) regardless of their position relative to the barrier creation instruction or the barrier inhibition instruction.

In some embodiments, the predetermined type comprises memory access instructions made to a persistent memory. Hence, instructions (e.g. memory access instructions) of other types could freely disregard the barrier. In some embodiments, instructions of other types may still be limited by other dependencies such as data dependencies.

In some embodiments, the data processing apparatus is adapted to perform speculative execution of at least some of the instructions in the stream of instructions; and the track circuitry is adapted to send an instruction that is to be speculatively executed to the processing circuitry, regardless of the one or more barrier dependencies of the instruction that is to be speculatively executed. Speculative execution is a technique in which some instructions are executed prior to knowing whether those instructions should be executed. For instance, branch prediction is a mechanism in which, at a branch instruction, a prediction is made as to the direction that the branch will go when executed. At that point, instructions at the predicted path of the branch will continue to be executed until such time as the branch is resolved. If the prediction was correct, then no stalling of the data processing apparatus was required to take place in order to resolve the branch. Meanwhile, if the prediction was wrong then the execution of the speculative instructions can be undone via a "rollback" in which case the data processing apparatus is in the same position than it would have been if it had to wait for the branch to be executed before continuing. In such embodiments, when instructions are speculatively executed, they may be permitted to ignore the barrier.

In accordance with some embodiments there is provided a data processing apparatus comprising: input circuitry to receive a plurality of input instructions comprising an atomic region; output circuitry to provide output instructions corresponding to the input instructions; and transformation circuitry to transform the input instructions into the output instructions, wherein the atomic region defines a subset of the input instructions in which, during execution, if one of the instructions in the subset fails to execute, then the subset of the input instructions are rewound; and the transformation circuitry generates, for an atomic instruction in the atomic region: a log instruction to log a state change caused by the atomic instruction, a barrier creation instruction, a corresponding instruction that corresponds with the atomic instruction, and a barrier inhibition instruction.

Within a program, an atomic section can be considered to be a section of code in which either all the instructions successfully complete or none of them do. In practice, it is common for such instructions to be executed in such a manner that they can be "rolled back". Hence, if one of the instructions fails then all of the instructions are reversed. In the above embodiments, an atomic section of code is implemented by the use of the above-mentioned barrier creation instruction and the barrier inhibition instruction. In particular, for each instruction in the atomic section, a log instruction is output. The log instruction provides necessary information for that instruction to be "rewound". A barrier creation instruction follows, and this is followed by an instruction that corresponds with the atomic instruction. Consequently, the instruction is permitted to execute once the log instruction has executed. In other words, the instruction executes once the necessary data to reverse the instruction has been stored. A barrier inhibition instruction then follows so that subsequent instructions are not similarly limited. When this sequence is repeated for multiple instructions in an atomic region, each instruction executes once the necessary data for undoing that instruction has been stored. However, the ordering of the instructions within the atomic block is not enforced by the barrier.

In some embodiments, the atomic instruction changes a previous state of a part of the data processing apparatus to a new state; and the log instruction is an undo log instruction that stores the previous state of the part of the data processing apparatus. Undo logs store state before that state is changed. For instance, the value of a register is saved in an undo log prior to the value of that register being changed. The log instruction therefore logs (or saves) the old version of the state, thus allowing that old state to be restored if necessary. In other embodiments, other techniques such as redo logs can be used.

In some embodiments, the atomic instruction is a memory access instruction.

In some embodiments, the memory access instruction is made to a persistent memory. As previously discussed, a persistent memory can be considered to be a byte-addressable memory (similarly to DRAM) in which the contents can be maintained even in the absence of power.

Particular embodiments will now be described with reference to the figures.

FIG. 1 illustrates a data processing apparatus 100 in accordance with some embodiments. A fetcher 110 is responsible for obtaining an instruction stream containing a plurality of instructions. One or more of the instructions in the stream may be memory access instructions that load or store from a memory. The instructions that are fetched by the fetcher 110 are passed to a decoder 120 in order to generate one or more control signals corresponding with those instructions. From there, the decoded instructions are passed to an issuer 130, which is responsible for scheduling. In this example, the issuer 130 is shown to be issuing (decoded) instructions to a load/store unit 140, which is responsible for handling memory access instructions that are to be sent out to a memory hierarchy. However, the issuer 130 may issue some of the (decoded) instructions to other executions units such as Arithmetic Logic Units (ALUs), and Floating Point Units (FPUs), etc.

In this example, the load/store unit 140 contains a queue 160, which tracks the decoded instructions that have been sent by the issuer 130. In this example, the queue 160 is shown to contain a load instruction (LD) followed a store instruction (ST), followed by a barrier creation instruction (PB), followed by a store instruction (ST), followed by a barrier inhibition instruction (SB), followed by a final store instruction (ST). Arrows are shown between the entries of the queue 160 in order to indicate dependencies. In this example, the fourth instruction is shown to have a dependency on the barrier creation instruction. Similarly, the final instruction is shown to have a dependency on the barrier creation instruction. The barrier creation instruction (PB) causes future instructions in the queue 160 to be dependent upon it. This applies to later instructions before a barrier inhibition instruction (SB) is encountered. Instructions encountered after the barrier inhibition instruction (and before any further barrier creation instruction) have no such dependency. If those instructions already have a dependency on the barrier creation instruction the dependency is removed (as illustrated in FIG. 1). Eventually, once the barrier creation instruction no longer has any dependencies on it and if a barrier inhibition instruction has been put in place, then the barrier creation instruction is removed from the queue (again as illustrated in FIG. 1).

The dependencies between the instructions can be complex and storage circuitry 150 is provided to store the dependencies. In this example, dependencies have been illustrated in respect of instructions. However, dependencies may exist on items of data used by the instructions as well as the instructions themselves.

The technique of using both a barrier creation instruction and a barrier inhibition instruction makes it possible to force particular ordering of instructions without extending that forced ordering where it is unwanted. Furthermore, the forced ordering is such that other instructions can be executed flexibly. This is illustrated in more detail with respect to FIG. 4.

Figure 2:
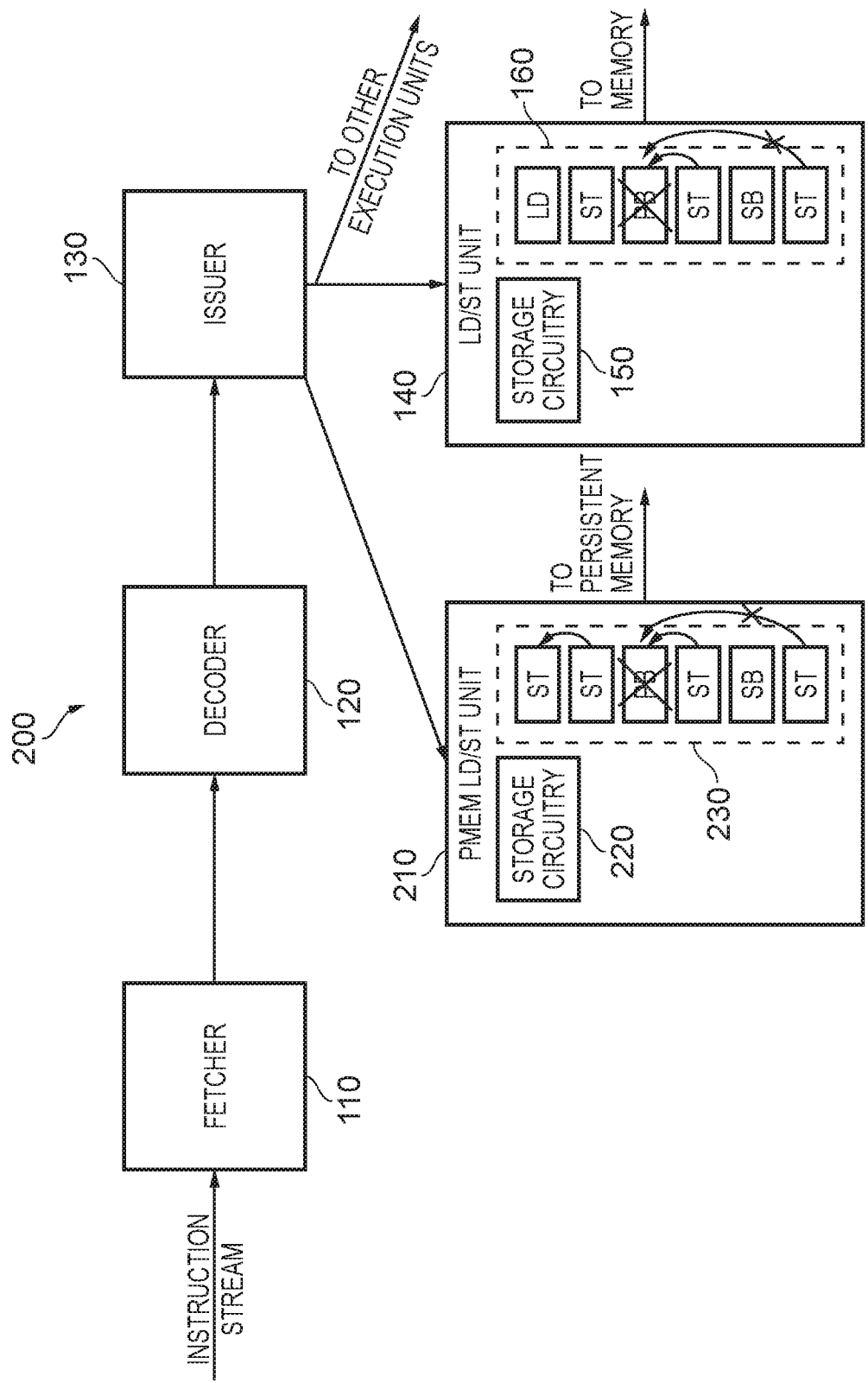
FIG. 2 schematically illustrates a further data processing apparatus in accordance with some embodiments.

FIG. 2 illustrates a variation 200 of the data processing apparatus 100. In this apparatus, a second load/store unit 210 is provided in respect of memory access instructions that are issued to a persistent memory. A persistent memory is a byte-addressable memory (similar to DRAM), but operates in such a manner that the contents are not lost when power is removed from the memory (similarly to storage in the form of a hard disk or SSD). The load/store unit 210 is provided with its own storage circuitry 220 for storing dependencies on the instructions stored within its own queue 230. As a consequence of using the duel load/store units 140, 210, a barrier instruction or a barrier inhibition instruction in one of the load/store units 140, 210 has no effect on memory access instructions in the other of the load/store units 140, 210. For instance, a barrier creation instruction in the load/store unit 140 for memory does not require memory access instructions that are sent to persistent memory that are handled by the second load/store unit 210 to be dependent upon it.

It will be appreciated that a similar technique can also be implemented using a single load/store unit 140 in which a separate field is used to indicate the destination of each memory access instruction (e.g. to persistent memory or other memory). In this way, again, barrier creation instructions and barrier inhibition instructions can be limited to memory access instructions that are sent to a particular type of memory.

Figures 3A, 3B:
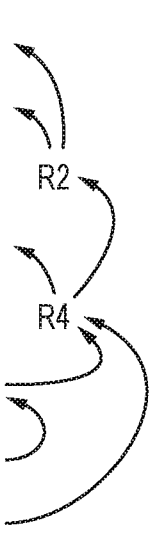
FIGS. 3A and 3B show an example of representing dependencies in accordance with some embodiments.

FIGS. 3A and 3B illustrate a manner in which the dependencies can be represented. FIG. 3A shows a sequence of eight instructions each with corresponding dependencies. In particular, the dependencies are generated by virtue of data dependencies. That is, for instance, the third instruction performs an addition between the values and registers R1 and R2, and stores the value in R3. However, this instruction cannot complete until the value from memory location x has been loaded into register R1 in instruction one and the value in memory location y has been stored in register R2 in instruction two. Consequently, instruction three is dependant on the execution of instructions one and two being performed.

FIG. 3B illustrates how these dependencies can be represented in the form of dependency matrix. The dependency matrix is a square matrix of a size equal to the number of instructions being executed. Any particular row represents the dependencies of an instruction and the columns represent instructions on which the dependencies may fall. For instance, the value in column i, row j represent the existence of a dependency of instruction i on instruction j. A "1" indicates that such a dependency exists, while a "0" indicates a lack of dependency. For instance, as previously explained, instruction three is dependent on instructions one and two. Consequently, a "1" exists in columns one and two of row three. Similarly, instruction number seven is dependent on instruction number six. Consequently, a "1" is found in row seven column six.

Note that for the purposes of tracking dependencies generated by the barrier creation and barrier inhibition instructions, the barrier inhibition instruction (SB) breaks those dependencies that track backwards. Consequently, the dependency matrix only needs to be completed for the lower left half of the matrix when tracking dependencies relating to the barriers.

With the architecture having been described, FIGS. 4A, 4B, and 4C illustrate how the barrier creation instruction and barrier inhibition instruction can be used in order to increase the flexibility of scheduling while maintaining ordering between some of the instructions.

FIG. 4A illustrates four instructions that are sequentially ordered A, B, C, D.

FIG. 4B illustrates the same four instructions A, B, C, D with barrier creation instructions (PB) and barrier inhibition instructions (SB) inserted. The insertion of a barrier between instructions A and B requires that instruction B wait until instruction A has been issued (or executed) before instruction B can be issued (or executed). However, the following barrier inhibition instruction means that the barrier does not extend to instructions after the barrier-inhibition instruction. Consequently, instructions C and D need not wait for the completion of instruction A or B before continuing. Similarly, the insertion of a barrier between instructions C and D means that instruction D must wait for instruction C. Again, the presence of a barrier inhibition instruction means that this same requirement is not extended to later instructions. This therefore provides a temporal ordering: instruction A must occur before instruction B and instruction C must occur before instruction D.

This leads to the scheduling illustrated in FIG. 4C. In particular, although there is enforced ordering between A and B and also between C and D, no such ordering is enforced between C and either of A and B or D and either or A and B. Consequently, instructions C and D can occur at any time relative to instructions A and B.

In contrast to a situation in which no barrier inhibition instruction is provided, this provides greater flexibility. For instance, if the barrier inhibition instruction was not present, then each of instructions B, C, and D must wait until instruction A has completed. The degree to which scheduling of the instructions is possible is therefore extended by virtue of the barrier creation instruction and the barrier inhibition instruction. Note that the barrier creation instruction between instructions D and C means that instruction D must wait until instruction C has completed. However, since a barrier inhibition occurs immediately before instruction C, the barrier does not extend any earlier than instruction C. That is, instruction D need not wait until instructions A, B, and C have completed.

Figure 5:
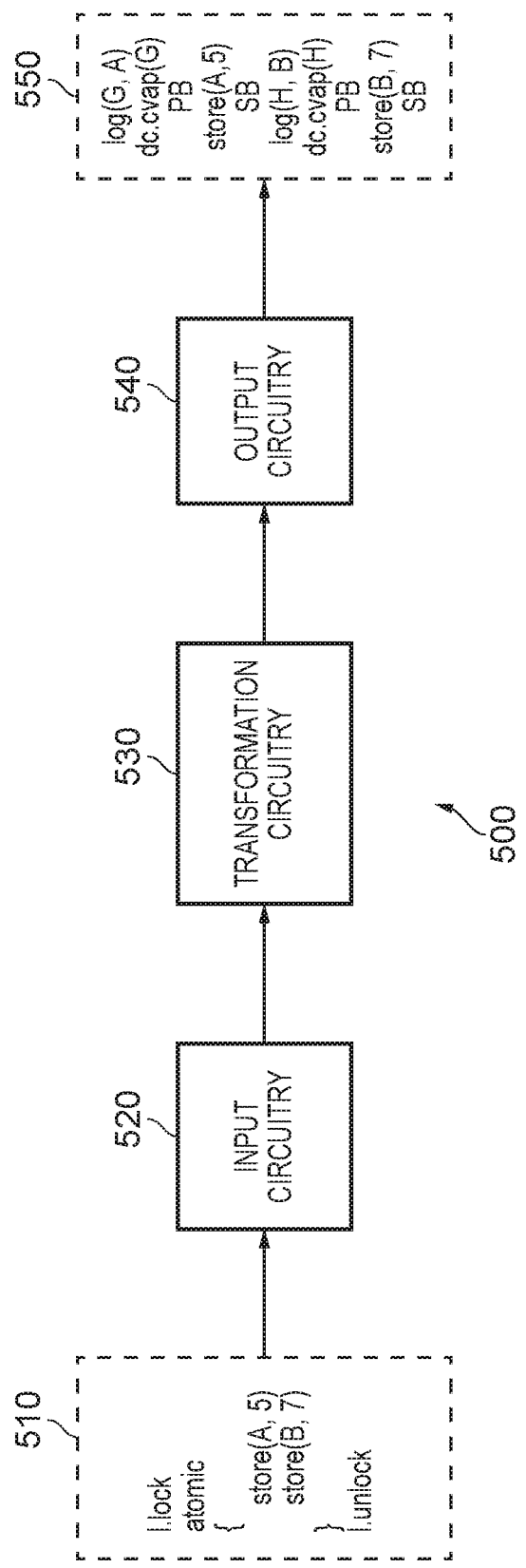
FIG. 5 schematically illustrates a transformative data processing apparatus for transforming input code having an atomic section into output code using barrier creation and inhibition instructions.

FIG. 5 illustrates how this technique can be applied to transform input code 510 having an atomic section into output code 550. For example, the input code could be source code and the output code 550 could be assembly. The input code 510 is received by the input circuitry 520, which passes the code to transformation circuitry 530. The transformation circuitry 530 transforms the input code 510 to the output code 550 and then passes the output code 550 to the output circuitry 540, which outputs the output code 550. The input code 510 includes an atomic section. An atomic section of code is a section of code for which each of the instructions contained within it are either executed in their entirety or are not executed at all. That is, it is not possible for only part of the atomic section to be executed, having exited the atomic section. This can be achieved by keeping track of each of the instructions within the atomic section so that they can be reversed if one of the instructions fails.

In the current example, the atomic section stores the value five in a location A and the value seven in a location (e.g. memory address) B, which would likely be stored in a cache. The transformation circuitry 530 transforms this as follows: first of all, the current value of location A is logged in a location G. Location G is then flushed (e.g. to persistent memory) by the instruction dc.cvap. A barrier is then put in place via the instruction PB. This means that further instructions encountered can only be executed once the log and flush instructions have been executed (until a barrier inhibition instruction is encountered). The next instruction is a store instruction that stores the value five in location A thereby overwriting the previous value in location A. Note that this is the first of the atomic instructions. By virtue of the barrier, this instruction can only take place once the old value of A has been stored in location G and then flushed to persistent memory. In other words, the value five can only be stored in location A once the old value of location A is stored, thereby enabling it to be restored if necessary. A barrier inhibition instruction is then placed. This means that further instructions do not require the initial log and flush instructions to be executed before proceeding. A further log instruction is then provided in order to store the current value of location B in location H. A further flush instruction flushes the value of location H (e.g. again to persistent memory) and a further barrier creation instruction is provided. This is followed by a store instruction that stores the value seven in location B and this is followed by a barrier inhibition instruction. Consequently, the storage of the value seven in location B can only take place when the previous value of location B has been stored to location H and flushed to persistent memory. In other words, the storage of the value seven in the location B is only committed to take part once the previous value of location B has been stored, thereby enabling it to be restored if necessary. The presence of the barrier creation instruction means, in both cases, sufficient information is stored so that both of the atomic instructions can be undone if necessary. However, the barrier inhibition instruction means that the extent to which ordering is put in place is limited. In other words, although the instruction causing the value seven to be stored in the location B is dependant on the old value of location B being stored and flushed, it is not enforced that that instruction must take place before the storage of the value five in location A. Consequently, the functionality of the atomic section is provided while enabling the order of those instructions to be varied. The second storage instruction of the value seven to location B could therefore take place before the first instruction storing the value five in the location A. Indeed, it is also possible for both instructions to take place simultaneously on, for instance, multiple processing circuits.

Figure 6:
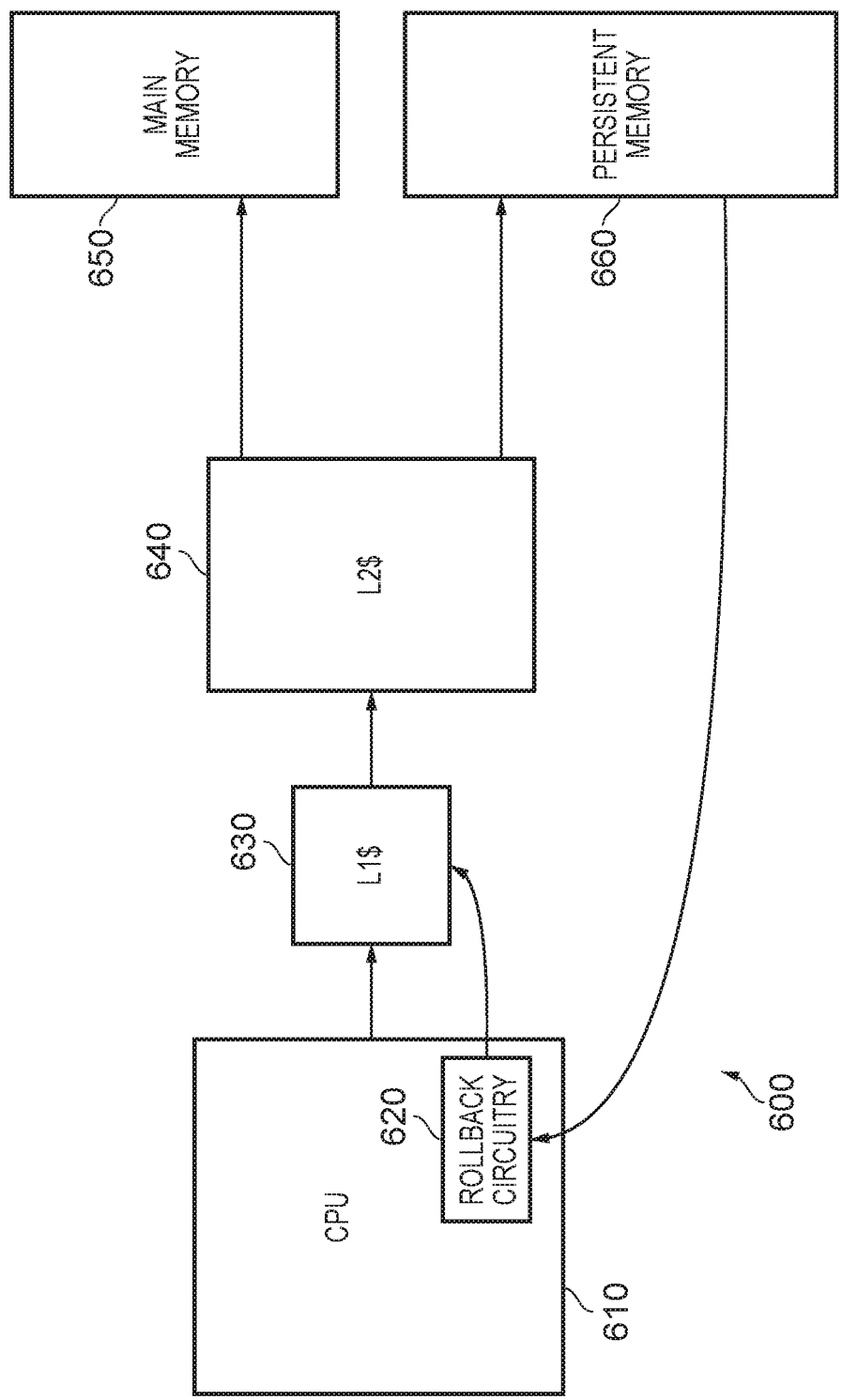
FIG. 6 schematically illustrates a data processing apparatus for executing the output code shown in FIG. 5.

FIG. 6 illustrates the data processing apparatus 600 on which the output code 550 illustrated in FIG. 5 may be executed. The apparatus 600 includes a Central Processing Unit (CPU) 610. The CPU 610 makes use of the memory hierarchy including a level 1 cache 630, a level 2 cache 640, a main memory (e.g. backed by DRAM) and a persistent memory 660. The flushing of data performed by the dc.cvap instructions in the output code 550 causes data to be written to, for instance, the persistent memory 660. On determining that an atomic section of code must abort and be rolled back, rollback circuitry 620 is provided as part of the CPU 610. The rollback circuitry 620 obtains the data that was flushed to persistent memory 660 and applies the data back to the level 1 cache 630. In this way, the old values of the data stored in the level one cache 630 are restored.

Figure 7:
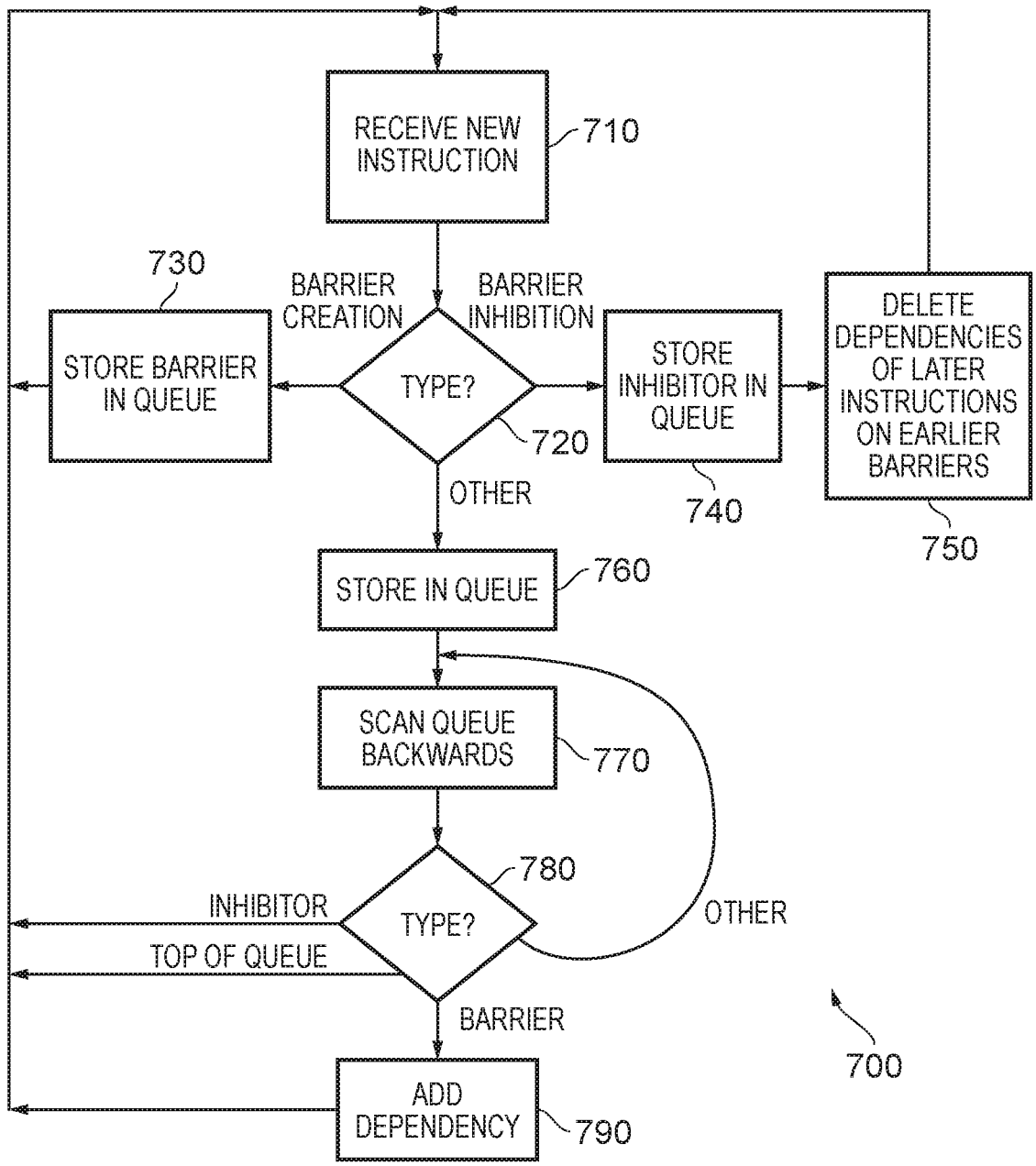
FIG. 7 shows a flowchart that illustrates a process of handling the barrier instructions together with other instructions in accordance with some embodiments.

FIG. 7 illustrates a flow chart 700 that illustrates a process of handling barrier creation instructions, barrier inhibition instructions, other instructions such as memory access instructions, and the various dependencies between them.

At a step 710, a new instruction is received. At a step 720 it is determined the type of the received instruction. If, at step 720 the instruction is deemed to be a barrier creation instruction, then at step 730, a barrier is stored in the queue 160. The process then returns to 710 where the next instruction is received. If, at 720, it is determined that the instruction is a barrier inhibition instruction, then at step 740, the inhibitor is stored in the queue 160. At a step 750, any dependencies on later instructions (i.e. appearing after the barrier inhibition instruction in the stream of instructions) that have already been added have their dependencies on earlier barriers deleted. The process then returns to step 710 where the next instruction is received. If, at step 720, the instruction is deemed to be of another type (e.g. a memory access instruction) then at step 760, the instruction is stored in the queue 160. At step 770, the queue 160 is scanned backwards. At a step 780, a type of the encountered instruction is considered. If the instruction is at the top of the queue 160, or if the instruction encountered is an inhibitor, then the process returns to 710 where the new instruction is received.

If the type of instruction is a barrier instruction then a dependency is added from the newly added instruction to the barrier at step 790. The process then again returns to step 710. Otherwise, if the instruction is of another type, then the scanning process is repeated at step 770 and a next most previous instruction is considered at step 780.

Consequently, barriers and barrier inhibitors are both stored in the queue. When other instructions are to be added, it is determined whether the most recent type of instruction encountered is a barrier—in which case a dependency on the barrier is added, or an inhibitor—in which case no dependency is added. Similarly, no dependency is added if the top of the queue is reached without either a barrier or inhibitor being found. There are a number of ways in which both barriers and inhibitors can be removed from the queue. In particular, a barrier can not be removed until such time as an inhibitor is encountered. This is because any future instruction could have a dependency on that barrier added. Once an inhibitor has been added, the barrier can be removed once no further instructions are dependent upon it. At that time, the inhibitor that inhibited the barrier can also be removed.

Note that this process assumes that each instruction is issued in the order in which the instructions are stored in the queue (e.g. the queue 160 of FIG. 1). If this is not the case, it is necessary to add a dependency from the barrier instruction to all preceding instructions until either the top of the queue is encountered, or a previous barrier inhibition instruction is encountered. In this way, the barrier causes previous instructions (up until a barrier inhibitor or the top of the queue is encountered) to be issued (or executed) before further instructions can be issued (or executed).

Figure 8:
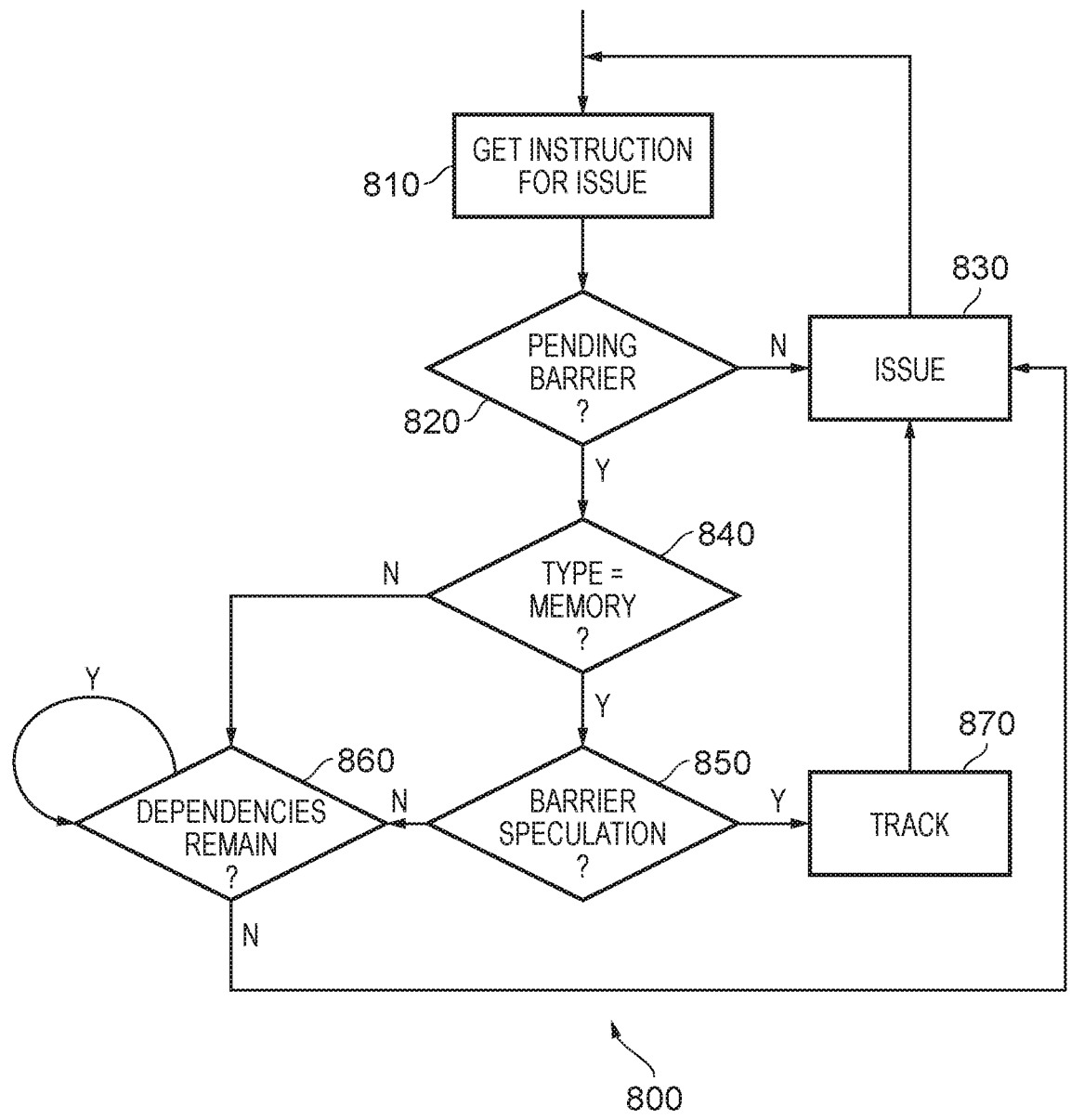
FIG. 8 shows a flowchart that illustrates a process for handling instruction issuing where speculation is involved.

FIG. 8 illustrates, in the form of a flowchart, a process for handling the issuing of instructions where speculation may be involved. At a step 810, it is determined which instruction is next to be issued. Step 820 determines whether there is a pending barrier in place—in particular, whether there is an uninhibited barrier that prevents this instruction from being executed. If not, then at step 830, the instruction is issued and the process returns to step 810. Otherwise, at step 840, it is determined if the instruction is a memory access instruction or not. If not, then at step 860, the process waits until the dependency on the barrier is resolved, i.e. until the dependency is removed or until the barrier is removed. The process then proceeds to step 830 where the instruction is issued. If the instruction is a memory access instruction then at step 850, it is determined whether speculation is being used. Speculation is a technique in which instructions can be executed before it is known whether they ought to be executed. Such a situation can arise in the case of a branch instruction where it is not clear (until the branch is evaluated) which way the branch will go (or to where). Rather than waiting for the branch to resolve, a prediction is made, and instructions begin execution at that location. If it turns out that the prediction was incorrect then the incorrectly executed instructions can be rewound and no or little performance impact occurs. Therefore, in the present case, it may be permitted to disregard the dependency on a barrier for the purposes of speculation. Hence, if speculation occurs then at a step 870, the instruction is tracked such that the instruction can be rewound and/or replayed if necessary. The process then proceeds to step 830 where the instruction is issued for execution. In this way, the ordering of instructions need only be maintained at an architectural level.

Figure 9:
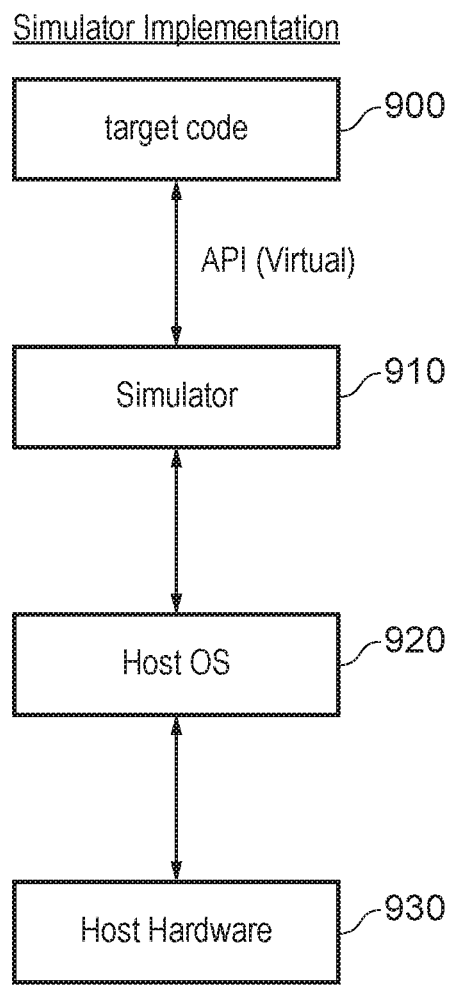
FIG. 9 illustrates a method of data processing in accordance with some embodiments.

FIG. 9 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 930, optionally running a host operating system 920, supporting the simulator program 910. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 930), some simulated embodiments may make use of the host hardware, where suitable.

The simulator program 910 may be stored on a computer-readable storage medium (which may be a non-transitory medium), and provides a program interface (instruction execution environment) to the target code 900 (which may include applications, operating systems and a hypervisor) which is the same as the application program interface of the hardware architecture being modelled by the simulator program 910. Thus, the program instructions of the target code 700, including the functionality of the fetcher 110, issuer 130, and load/store unit 140, which provides for the creation and removal of dependencies based on barrier creation and inhibition instructions described above, may be executed from within the instruction execution environment using the simulator program 910, so that a host computer 930 which does not actually have the hardware features of the apparatus 100 discussed above can emulate these features.

In the above descriptions, an example has been given of load/store units 140, 210 that store dependencies between instructions such as the barrier creation instruction, and that respond to the barrier inhibition instruction to relax such dependencies. However, it is also possible for such functionality to be made elsewhere in the memory hierarchy such as within caches or within read/write queues inside memory controllers. To this extent, the term "instruction" can be interpreted broadly as representing an operation generated on behalf of an instruction. Similarly, such tracking could be made part of an issuer 130 that handles scheduling of all instructions, rather than those that are used for accessing a memory hierarchy.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   obtain circuitry to obtain a stream of instructions, the stream of instructions comprising a barrier creation instruction and a barrier inhibition instruction; and
   track circuitry to order sending each instruction in the stream of instructions to processing circuitry based on one or more dependencies, wherein
   the track circuitry is responsive to the barrier creation instruction to cause the one or more dependencies to include one or more barrier dependencies in which pre-barrier instructions, occurring before the barrier creation instruction in the stream, are sent before post-barrier instructions, occurring after the barrier creation instruction in the stream, are sent; and
   the track circuitry is responsive to the barrier inhibition instruction to relax the barrier dependencies to permit post-inhibition instructions, occurring after the barrier inhibition instruction in the stream, to be sent before the pre-barrier instructions.

2. The data processing apparatus according to claim 1, wherein
   the pre-barrier instructions, the post-barrier instructions, and the post-inhibition instructions comprise memory access instructions.

3. The data processing apparatus according to claim 2, wherein
   the memory access instructions are made to a persistent memory.

4. The data processing apparatus according to claim 1, wherein
   the one or more dependencies comprise one or more data dependencies between the instructions.

5. The data processing apparatus according to claim 1, wherein
   the track circuitry comprises queue circuitry comprising one or more entries, each of the entries corresponding to one of the instructions; and
   the track circuitry comprises storage circuitry to store a dependency matrix to represent the one or more dependencies.

6. The data processing apparatus according to claim 5, wherein
   the track circuitry is adapted, in response to receiving a new instruction, to search the queue circuitry for an earlier barrier creation instruction and an earlier barrier inhibition instruction;
   when the earlier barrier creation instruction is found and the earlier barrier inhibition instruction is unfound, the barrier dependencies are added to inhibit the new instruction from being sent until the pre-barrier instructions are sent; and
   when the earlier barrier creation instruction is found and the earlier barrier inhibition instruction is found, the track circuitry inhibits adding the barrier dependencies.

7. The data processing apparatus according to claim 1, wherein
   the track circuitry is a load store queue.

8. The data processing apparatus according to claim 1, comprising:
   transaction circuitry to store a transaction of at least some of the instructions; and
   rollback circuitry to restore a previous state of the processing circuitry corresponding to before execution of the instructions, based on the transaction.

9. The data processing apparatus according to claim 7, wherein
   the track circuitry is adapted to send at least some of the instructions between the barrier creation instruction and the barrier inhibition instruction to the processing circuitry out of order.

10. The data processing apparatus according to claim 7, wherein
    the processing circuitry comprises a plurality of processing circuits; and
    the track circuitry is adapted to send at least some of the instructions between the barrier creation instruction and the barrier inhibition instruction to different ones of the processing circuits.

11. The data processing apparatus according to claim 1, wherein
    the one or more barrier dependencies are dependencies of instructions of a predetermined type.

12. The data processing apparatus according to claim 11, wherein
    the predetermined type comprises memory access instructions made to a persistent memory.

13. The data processing apparatus according to claim 1, wherein
    the data processing apparatus is adapted to perform speculative execution of at least some of the instructions in the stream of instructions; and
    the track circuitry is adapted to send an instruction that is to be speculatively executed to the processing circuitry, regardless of the one or more barrier dependencies of the instruction that is to be speculatively executed.

14. A data processing method, comprising:
    obtaining a stream of instructions, the stream of instructions comprising a barrier creation instruction and a barrier inhibition instruction; and
    sending each instruction in the stream of instructions to processing circuitry in order based on one or more dependencies, wherein
    in response to the barrier creation instruction, the one or more dependencies are amended to include one or more barrier dependencies in which pre-barrier instructions, occurring before the barrier creation instruction in the stream, are sent before post-barrier instructions, occurring after the barrier creation instruction in the stream, are sent; and in response to the barrier inhibition instruction, the barrier dependencies are relaxed to permit post-inhibition instructions, occurring after the barrier inhibition instruction in the stream, to be sent before the pre-barrier instructions.

15. A computer program product stored on a non-transitory, computer-readable medium for controlling a host data processing apparatus to provide an instruction execution environment for execution of instructions, the computer program product comprising:

obtaining logic to obtain a stream of instructions, the stream of instructions comprising a barrier creation instruction and a barrier inhibition instruction; and sending logic to send each instruction in the stream of instructions to processing circuitry in order based on one or more dependencies, wherein in response to the barrier creation instruction, the one or more dependencies are amended to include one or more barrier dependencies in which pre-barrier instructions, occurring before the barrier creation instruction in the stream, are sent before post-barrier instructions, occurring after the barrier creation instruction in the stream, are sent; and in response to the barrier inhibition instruction, to relax the barrier dependencies are relaxed to permit post-inhibition instructions, occurring after the barrier inhibition instruction in the stream, to be sent before the pre-barrier instructions.

16. A data processing apparatus comprising:

input circuitry to receive a plurality of input instructions comprising an atomic region;

output circuitry to provide output instructions corresponding to the input instructions; and transformation circuitry to transform the input instructions into the output instructions, wherein the atomic region defines a subset of the input instructions in which, during execution, if one of the instructions in the subset fails to execute, then the subset of the input instructions are rewound; and the transformation circuitry generates, for an atomic instruction in the atomic region:
a log instruction to log a state change caused by the atomic instruction,
a barrier creation instruction,
a corresponding instruction that corresponds with the atomic instruction, and
a barrier inhibition instruction.

17. The data processing apparatus according to claim 16, wherein
the atomic instruction changes a previous state of a part of the data processing apparatus to a new state; and
the log instruction is an undo log instruction that stores the previous state of the part of the data processing apparatus.

18. The data processing apparatus according to claim 17, wherein
the atomic instruction is a memory access instruction.

19. The data processing apparatus according to claim 18, wherein
the memory access instruction is made to a persistent memory.

20. A data processing method comprising:
receiving a plurality of input instructions comprising an atomic region;
providing output instructions corresponding to the input instructions; and
transforming the input instructions into the output instructions, wherein
the atomic region defines a subset of the input instructions in which, during execution, if one of the instructions in the subset fails to execute, then the subset of the input instructions are rewound; and
the step of transforming generates, for an atomic instruction in the atomic region:
a log instruction corresponding with the atomic instruction,
a barrier creation instruction,
a corresponding instruction that corresponds with the atomic instruction, and
a barrier inhibition instruction.

* * * * *